(12) United States Patent
Flacks et al.

(10) Patent No.: US 6,728,872 B1
(45) Date of Patent: Apr. 27, 2004

(54) METHOD AND APPARATUS FOR VERIFYING THAT INSTRUCTIONS ARE PIPELINED IN CORRECT ARCHITECTURAL SEQUENCE

(75) Inventors: Brian King Flacks, Georgetown, TX (US); Harm Peter Hofstee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,931

(22) Filed: Feb. 4, 2000

(51) Int. Cl.[7] .............................................. G06F 9/40
(52) U.S. Cl. ...................................... 712/233; 712/239
(58) Field of Search ................................ 712/233, 239, 712/240

(56) References Cited

U.S. PATENT DOCUMENTS

| | | | | |
|---|---|---|---|---|
| 4,991,080 A | * | 2/1991 | Emma et al. | 712/206 |
| 5,222,240 A | * | 6/1993 | Patel | 712/218 |
| 5,542,109 A | * | 7/1996 | Blomgren et al. | 712/234 |
| 5,799,167 A | * | 8/1998 | Lesartre | 712/200 |
| 5,954,814 A | * | 9/1999 | Zaidi et al. | 712/227 |
| 6,189,092 B1 | | 2/2001 | Ogura et al. | |
| 6,279,100 B1 | * | 8/2001 | Tremblay et al. | 712/219 |

FOREIGN PATENT DOCUMENTS

| | | |
|---|---|---|
| EP | 0889395 B1 | 9/2001 |
| KR | PUPA 98-83442 | 12/1998 |

* cited by examiner

*Primary Examiner*—David Wiley
*Assistant Examiner*—Scott M. Collins
(74) *Attorney, Agent, or Firm*—Casimer K. Salys; Bracewell & Patterson, L.L.P.

(57) ABSTRACT

A method and apparatus for enabling the correct architectural sequencing of fetched instructions prior to allowing the instructions to complete in the processor pipeline to reduce the occurrence of pipeline breaks. A branch processing unit (BPU) is designed to perform sequence checks for the addresses of all instructions fetched into the pipeline (i.e., both in-line and branch instructions) by the instruction fetch unit (IFU). A first instruction is fetched. The address of the next instruction in the architectural sequence is computed and stored within the BPU. The next instruction is fetched and its address is compared to the next instruction address stored in BPU to determine if it is the correct address. If the next instruction address matches that of the architectural sequence, the instruction is permitted to "live" (i.e., continue through to completion). When the address does not match, the instruction is killed (i.e., not allowed to complete) and a new instruction is fetched by the IFU.

22 Claims, 3 Drawing Sheets

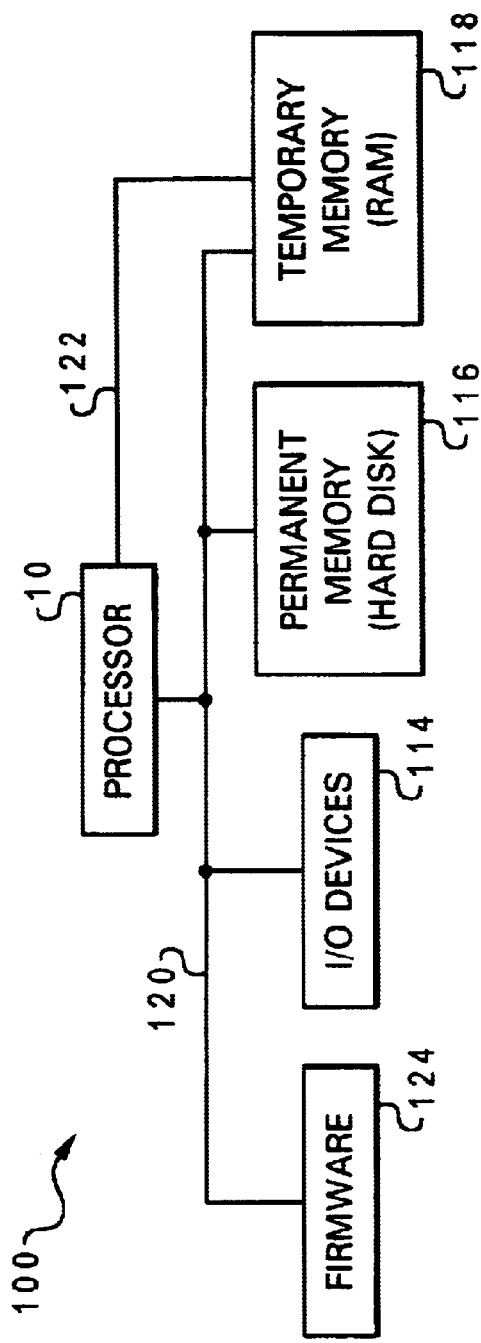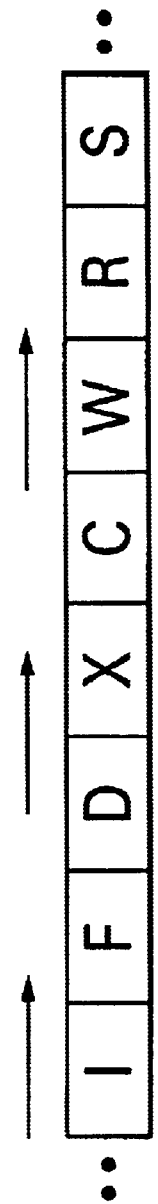

METHOD AND APPARATUS FOR VERIFYING THAT INSTRUCTIONS ARE PIPELINED IN CORRECT ARCHITECTURAL SEQUENCE

BACKGROUND OF THE INVENTION

1. Technical Field

The present invention relates in general to data processing systems and in particular to a method and apparatus for checking the sequencing of fetched instructions within a data processing system. Still more particularly, the present invention relates to a method and apparatus for enabling correct architectural sequencing of instructions placed within a processor pipeline.

2. Description of the Related Art

A conventional processor may include an instruction fetch unit (IFU) for requesting instructions to be loaded, an instruction cache for storing instructions, an instruction Buffer for temporarily storing instructions fetched from the instruction cache for execution, a number of execution units for executing sequential instructions, a branch processing unit (BPU) for executing branch instructions, a dispatch unit for dispatching sequential instructions from the instruction Buffer to particular execution units, and a completion Buffer for temporarily storing instructions that have finished execution, but have not been completed.

In these conventional processors, branch instructions and sequential instructions are handled differently. Address resolution, or the process of ensuring that an address is correct or matches the associated instruction is typically performed for branch instructions by the BPU. The BPU compares the supplied target addresses and branch direction for branch instructions with the computed architectural next address. All other instructions (e.g., inline instructions) are assumed to follow the correct architectural sequence when placed in the processor pipeline. When this assumption proves to be incorrect (i.e., instructions fall out of sequence) as occurs during unobserved data dependencies, hardware defects, crossing of information in cache lines, synchronous exceptions and instruction mis-sequencing, etc., in the processor not being able to continue its regular processing of instructions (referred to as a pipeline break—no useful information being processed by the processor), which ultimately leads to reduced processor efficiency.

The present invention thus recognizes that it would be desirable and beneficial to have a system or apparatus for ensuring that all instructions fetched by a processor into its pipeline follows the correct architectural sequencing. A system which supports instruction address resolution to provide all instructions in their correct sequence would be a welcomed improvement. Finally, the present invention recognizes that such a system would be further enhanced by providing efficient restart of instruction sequencing when an incorrectly sequenced instruction is located and removed from the pipeline.

These and other benefits are presented in the invention described herein.

SUMMARY OF THE INVENTION

A method and apparatus are disclosed for enabling the correct architectural sequencing of fetched instructions prior to allowing the instructions to complete in the processor pipeline to reduce the occurrence of pipeline breaks. A branch processing unit (BPU) is designed to perform sequence checks for the addresses of all instructions fetched into the pipeline (i.e., both in-line and branch instructions) by the instruction fetch unit (IFU). A first instruction is fetched. The address of the next instruction in the architectural sequence is computed and stored within the BPU. The next instruction is fetched and its address is compared to the next instruction address stored in BPU to determine if it is the correct address. If the next instruction address matches that of the architectural sequence, the instruction is permitted to "live" (i.e., continue through to completion). When the address does not match, the instruction is killed (i.e., not allowed to complete) and a new instruction is fetched by the IFU.

In a preferred embodiment, instructions can be killed at any stage of the pipeline. When an instruction is killed, its live signal is de-asserted, and travels through the remainder of the pipeline as though it was a none operation (nop) that does not advance the program counter. A register within the branch unit holds the architectural sequence address. If a live instruction from an incorrect address attempts to pass through the BPU, the BPU kills the instruction. When such an instruction is killed, the architecturally correct instruction address is loaded into the IFU to permit the IFU to continue fetching instructions from the point at which the last correct instruction was fetched. Thus, an almost instantaneous restart of instruction fetching is provided, which substantially reduces the occurrence of pipeline breaks at later pipeline stages.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram of a data processing system utilized in one embodiment of the present invention;

FIG. 3A is a block diagram representation of the various stages in instruction processing according to one implementation of the present invention;

DETAILED DESCRIPTION OF ILLUSTRATIVE EMBODIMENT

Figure 2:
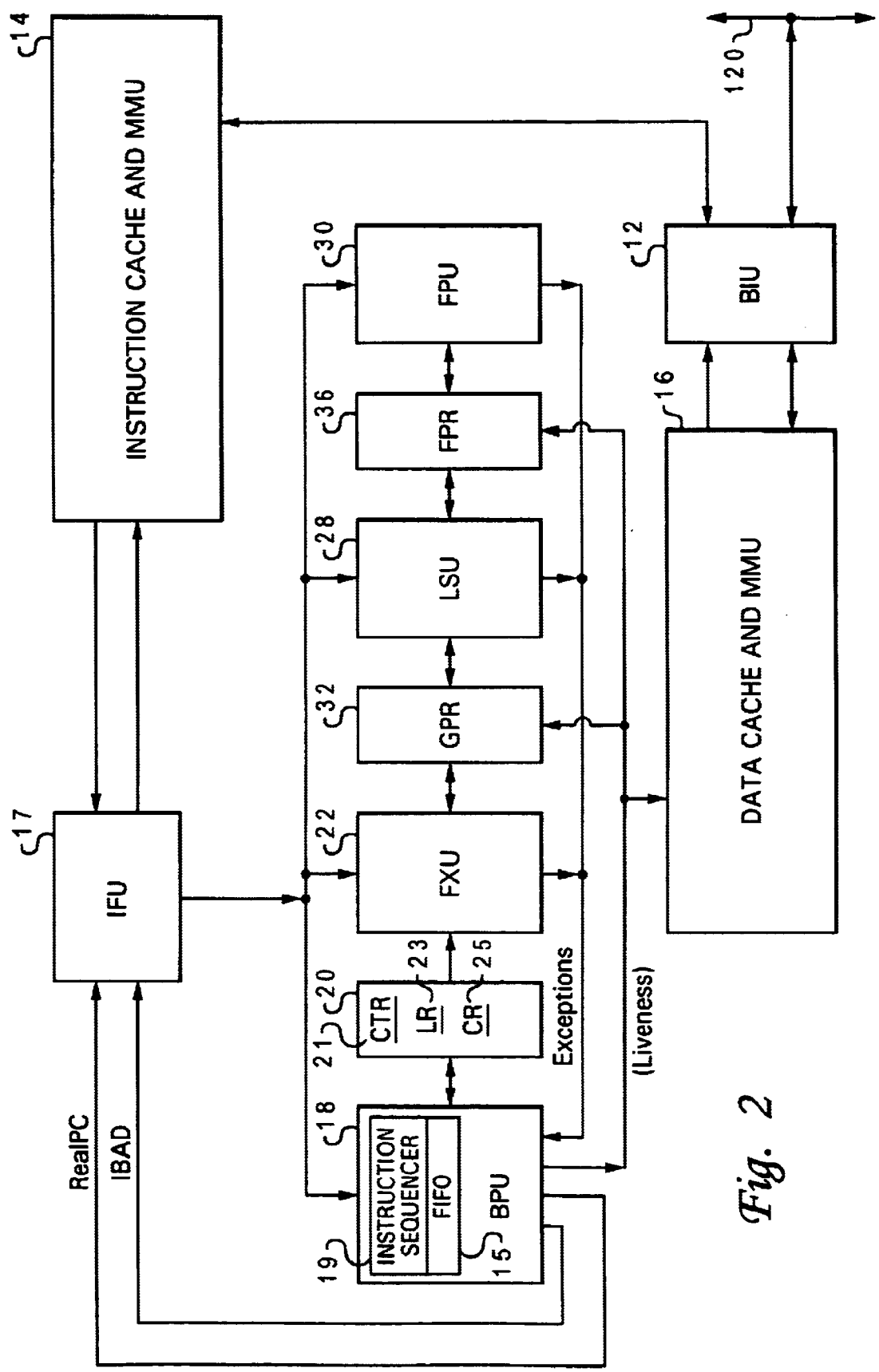
FIG. 2 is a block diagram of an embodiment of a processor which utilizes the method and system of the present invention.

With reference now to the figures and in particular with reference to FIG. 1, there is illustrated a block diagram of the basic structure of a data processing system 100 utilized in a preferred embodiment of the invention. Data processing system 100 has at least one processor 10 which is connected to several peripheral devices, including input/output devices 114 (such as a display monitor, keyboard, and graphical pointing device) for user interface, a permanent memory device 116 (such as a hard disk) for storing the data processing system's operating system and applications, and a temporary memory device 118 (such as random access memory or RAM) that is utilized by processor 10 in execution of current program instructions. Processor 10 communicates with the peripheral devices by various means, including a bus 120 or a direct channel 122 (more than one bus 120 may be provided utilizing a bus bridge) controlled by a bus interface unit (not illustrated).

Those skilled in the art will further appreciate that there are other components that might be utilized in conjunction with those shown in the block diagram of FIG. 1; for example, a display adapter connected to processor 10 might be utilized to control a video display monitor, and a memory controller may be utilized as an interface between temporary memory device 118 and processor 10. Data processing system 100 also includes firmware 124 whose primary purpose is to seek out and load an operating system from one of the peripherals (usually permanent memory device 116) whenever data processing system 100 is powered. In the preferred embodiment, processor 10 of data processing system 100 is a high-frequency, short-pipelined processor.

FIG. 2 is a high level block diagram of a processor 10, according to a preferred embodiment of the present invention. Processor 10 may be located within data processing system 100 as depicted in FIG. 1. In the preferred embodiment, processor 10 is a single integrated circuit, high-frequency processor. Accordingly, as discussed further below, processor 10 includes various execution units, registers, Buffers; memories, and other functional units, which are all formed by integrated circuitry. Processor 10 is coupled to system bus 120 via a bus interface unit (BIU) 12. BIU 12 controls the transfer of information between processor 10 and other devices coupled to system bus 120 such as a main memory.

BIU is connected to instruction cache 14 and data cache 16 within processor 10. High speech caches, such as instruction cache 14 and data cache 16, enable processor 10 to achieve relatively fast access time to a subset of instructions or data previously transferred from main memory to instruction cache 14 and data cache 16, thus improving the speed of operation of the data processing system.

Instruction cache 14 is further coupled to instruction fetch unit (IFU) 17. In the depicted embodiment, the execution circuitry of processor 10 comprises multiple execution units, including branch processing unit (BPU) 18, fixed-point unit (FXU) 22, load/store unit (LSU) 28, and floating-point unit (FPU) 30. As is well known by those skilled in the art, each of execution units FXU 22, LSU 28, and FPU 30 executes one or more instructions within a particular class of sequential instructions during each processor cycle. For example, FXU 22 performs fixed-point mathematical operations such as addition, subtraction, ANDing, ORing, and XORing utilizing source operands received from specified general purpose registers (GPRs) 32. Following the execution of a fixed point instruction, FXU 22 outputs the data results of the instructions to one or more of GPRs 32. Conversely, FPU 30 performs floating-point operations, such as floating-point multiplication and division, on source operands received from floating-point registers FPRs 36. FPU 30 outputs data resulting from the execution of floating-point instructions to selected FPRs 36. As its name implies, LSU 28 executes floating-point and fixed-point instructions which either load data from memory (i.e., either data cache 16 or main memory) into selected GPRs 32 or FPRs 36 or which store data from selected GPRs 32 or FPRs 36 to memory.

In a preferred embodiment, IFU 17 provides an output of both sequential and branch instructions to BPU 18. Branch prediction may be completed using any conventional method or newly developed method. For example, branch prediction may be completed within IFU 17. BPU 18 executes branch instructions to compute whether or not the branch is taken, and, if the branch is taken, the target address. BPU 18 also checks the speculative instruction stream to detect branch mis-predictions. Additionally, in a preferred embodiment, BPU 18 is designed to perform the architectural sequencing features of the present invention as described below. BPU 18 receives all fetched instructions and corresponding addresses from the IFU 17. BPU 18 also receives information from the condition set registers 20, which includes count register (CTR) 21, link register (LR) 23, and condition register (CR) 25. Condition set registers 20 are set by FXU 22 during processing. Finally, BPU 18 receives exceptions (i.e., any of a number of occurrences which may lead to a pipeline break based on faulty instruction processing within the execution circuitry) from FXU 22, LSU 28 and FPU 30. BPU 18 contains a instruction sequencer 19 which includes a FIFO 15. FIFO 15 is a logic block, which determines whether or not to kill an instruction being processed within the execution circuitry, as will be discussed with reference to FIG. 4 below. BPU 18 thus operates to minimize the latency of the branch mis-predict delay, while ensuring correct architectural sequencing of inline instructions.

Instructions are processed by each of FXU 22, LSU 28 and FPU 30, and BPU 18 at a sequence of pipeline stages (or cycles). FIG. 3A illustrates the pipeline stages for processing instructions in the processor 10 of the present invention. These stages include instruction fetch request (I), instruction fetch (F), decode/dispatch (D), execute (X), check (C), write (W), roll back (R), and second roll back (S). The present invention is primarily concerned with the D, X, C, and W stages, which are discussed further below.

Returning now to FIG. 2, the present invention utilizes the BPU 18 to compute the architectural sequence of instruction addresses, verify that the correct sequence is flowing through the processor pipeline, cause incorrect instruction sequences to be terminated before they are completed, and restart instruction fetching at the correct address.

BPU 18 is preferably implemented utilizing several general purpose, custom dynamic macros, a small library of latches, a family of automatically generated programmable logic arrays (PLAs) and a single stage of merging logic. In a preferred embodiment, the BPU 18 is designed using 4 compare units (CU), a'single operand compare unit (CU_LT), 3 adders, and 13 PLAs. The outputs of the dynamic macro can then be merged with other outputs in a stage of simple logic. Simple logic consists of a static two input NAND gate, a static two input NOR gate, or a domino 3A30 gate. These signals then are amplified or inverted and distributed where they are either data into a latch or Mux-Latch selects. In the preferred embodiment, all of the registers in the BPU design are 6 input multiplexer-latches (Mux-latch).

Figure 3B:
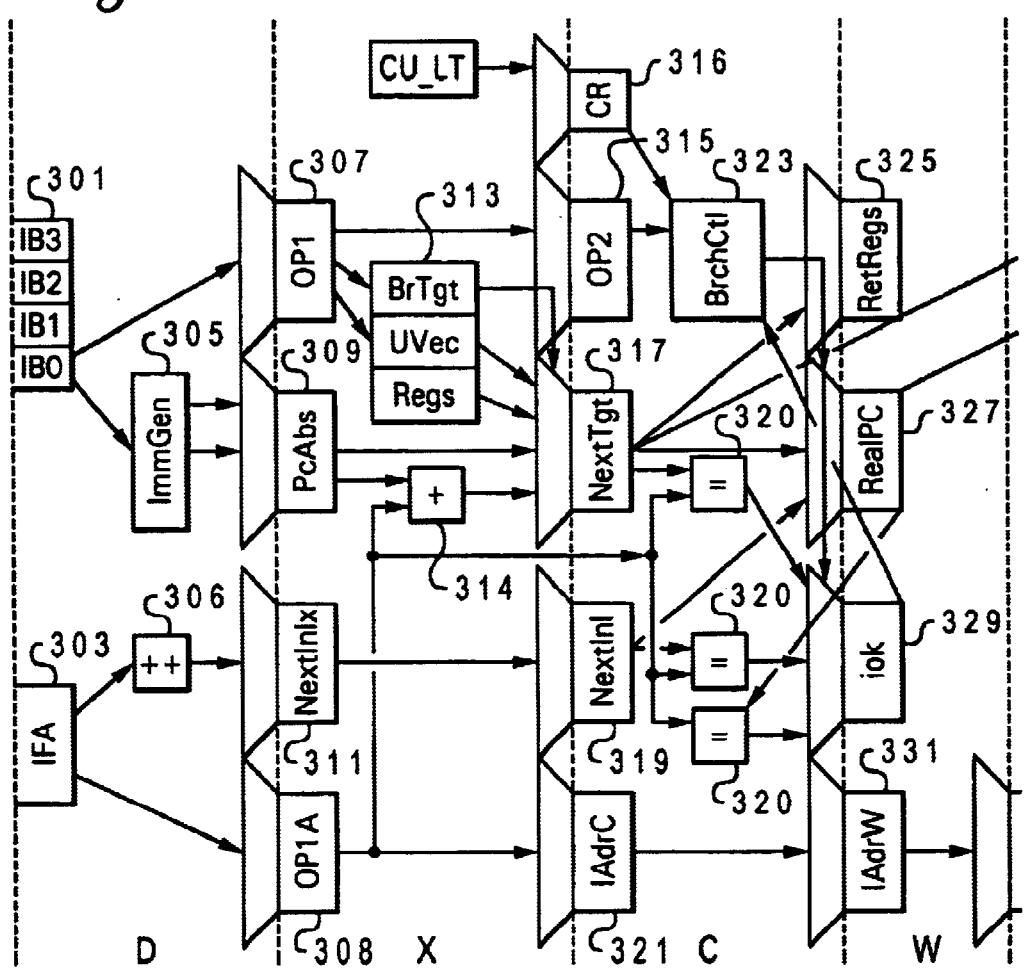
FIG. 3B is a high level block diagram of certain of the pipeline stages in accordance with a preferred implementation of the present invention.

FIG. 3B is a processor pipeline diagram. It illustrates the BPU pipeline, including the middle stages at which the processing of instructions in architectural sequence occur. Both inline instruction fetching and branch instructions are handled within BPU 18.

The fetch stage of the pipeline is controlled by the IFU. During the fetch stage, IFU 17 retrieves one or more instructions associated with one or more memory addresses from instruction cache 14. Instructions fetched from instruction cache 14 are sent by IFU 17 directly to BPU 18 for processing.

At the end of the F stage, BPU 18 receives several inputs from the IFU, including: (1) the instruction Buffer (IB), (2) the validated instruction fetch address (IFA), and (3) an indicator value which informs BPU 18 whether the IFU requires that instructions in various stages not be allowed to complete (referred to as kills within the art).

DECODE (D) STAGE

During the decode stage, IFU 17 decodes and dispatches one or more instructions to the appropriate ones of execution units BPU 18, FXU 22, LSU 28 and FPU 30. Decoding involves determining the type of instruction including its characteristics, and the execution unit to which it should be dispatched. It also involves determining whether or not the instruction is speculative.

When a branch is in the BPU's decode cycle (D), the branch text is located in the first instruction Buffer, IB0, of instruction buffers 301 and the address of the branch instruction is in the IFA register 303. A sign extender 305 extracts and sign extends 16 and 26 bit immediates from the branch text, one of which is latched in the PCAbs register 309. An adder 306 increments the IFA 303 into the next in line (NextInlx) register 311. The branch instruction itself is transferred into the OPI 307 and the IFA 303 into the OPlA register 308

In the preferred embodiment, for a particular instruction, BPU 18 assumes the instruction's predecessor belongs to the correct instruction sequence, and based upon the address of the instruction, computes the address of the next instruction in the architectural sequence. BPU 18 commits the address of the next instruction in the sequence to the RealPC register 327 at the end of the check (C) stage of the integer pipeline.

EXECUTION (X) STAGE

During the execute (X) stage, the branch immediate (PcAbs) is added to the fetch address Q (now in OP1A) (block 314). The opcode in OP1 latch 307 provides the branch target (BrTgt) and UVec decoder, which are stored in the BrTgt and UVec register 313. The Uvec decoder prepares a possible microcode entry address, while the BrTgt decoder prepares MUX selects to select the proper branch target into the NextTgt latch 317. The instruction is passed from OPI register 307 to OP2 register 315. Also, the instruction address is also passed from OP1A register 308 into IAdrC register 321.

The execution stage (X) of the branch is also the check stage (C) of a possibly preceding condition code setting instruction. BPU 18 also generates the branch's target address during the X stage and decodes the branch. The target address can be generated in several ways: an absolute immediate, relative displacement, an emulation routine vector, or any of a number of registers. Adder 314 sums the branch address 308 and the immediate 309. Two PLAs driven by OP1 decode the branch. One generates the emulation vector while the other generates select signals that drive the target multiplexer and two signals, branch_always and branch_never, that are latched for processing in the next stage.

CHECK (C) STAGE

In the C stage, IFU 17 decides how the architectural program counter (RealPC) 327 will be updated, and whether or not the instruction speculator has sent the correct instruction stream. The next RealPC address can be either: (1) NextTgt 317, if the branch is taken, (2) NextInl 319 if the branch is not-taken, or (3) the appropriate exception address. However, if the processor cannot advance, the current RealPC 327 is utilized, as when a re-fetch is required.

When the instruction enters the check cycle (C), the target address, the in-line address and the condition code registers (CR) 316 are all computed. The output from NextTgt register 317 is passed to RetRegs register 325 and RealPC register 327. The instruction address is also passed from IAdrC register 321 into IAdrW register 331. This information is made available in latches, and branch control 323 determines what the next instruction type should be.

There are four possible instruction types with respect to the next instruction: (1) an exception could be present; (2) the instruction could be dead; (3) the instruction could be a taken branch; or (4) the instruction could be something other than a taken branch. Thus the RealPC latch 327 in the write stage is loaded with one of several possible values corresponding to the particular type of instruction. It can be loaded with (1) an exception vector, held from the previous cycle, (2) the target address, or (3) the inline address at the end of the C cycle, respectively.

Branch control 323 generates the selects for RealPC 327. At the same time, three comparisons are completed to determine if the address that is going to be loaded into the RealPC latch matches the address of the instruction in the X stage of the pipeline. The compare unit 320 is used to compare two operands (namely, architectural address and next instruction address) for equality. The instruction okay (iok) 329 signal is also latched at the end of the C stage. Thus the BPU assumes the instruction in the C stage is correctly sequenced, computes the address of the instruction that should be in the X stage and verifies that the correct instruction is indeed in the X stage of the pipeline.

WRITE STAGE

If the instruction in the X stage is not correct, the RealPC latch 327 is held, the instructions in X and D stages are killed, and the IFU notified that a re-fetch is required at the RealPC address.

BPU 18 thus requires a match between instructions it supplies, and instruction addresses it supplies. It also guarantees that after a re-fetch request at least one instruction is provided starting at the address of the re-fetch request.

Figure 4:
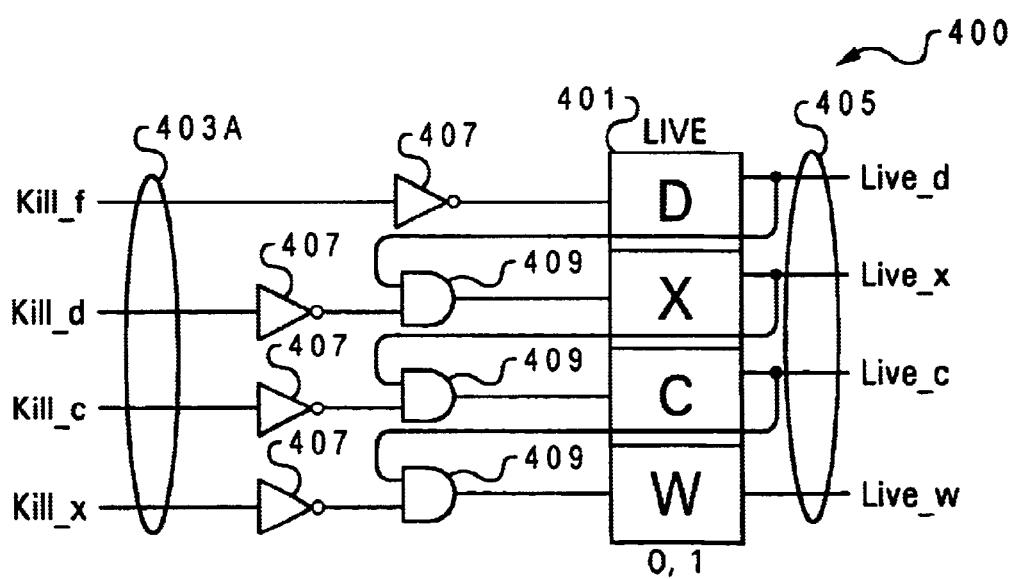
FIG. 4 is an diagram of an instruction live logic block in accordance with one preferred embodiment of the present invention.

FIG. 4 illustrates a preferred embodiment of a logic block 400 in accordance with the present invention. Live logic block 400 represents control logic within BPU 18. According to FIG. 2, input to live logic block 400 is received from the components within the processor pipeline(i.e., IFU 17 and execution circuitry, FXU 22, LSU 28, and FPU 30.) during instruction processing. Output from BPU 18 is controlled by the output of live logic block 400. Specifically, BPU 18 transmits liveliness signals to the execution circuitry, GPR 32 and FPR 36. These outputs indicate liveliness of instructions at the various pipeline stages. Simultaneously, BPU 18 transmits IBAD and RealPC to IFU 17, whenever the output from live logic block 400 indicates that the instruction in a particular pipeline stage is to be killed.

Returning now to FIG. 4, live logic block 400 maintains a four-bit first-in first-out (FIFO) register 401 of instruction live bits. FIFO 401 keeps track of the state of the processor. The four bits correspond to a pipeline stage, at which the architectural sequence and/or liveliness of the next instruction may be checked. Each stage thus has a corresponding live bit, that by its state, informs the controls of BPU 18 whether the instruction(s) at that stage of the pipeline is live (or should be live). An instruction can either be live (1) or dead (0) depending on the value of the live bit. If an instruction is live it will be allowed to complete its current stage, while a dead instruction, which causes pipeline breaks, is not allowed to complete its current stage. A dead instruction may be a result of an exceptional condition, such as a cache miss, an overflow condition, a faulty translation address, etc.

Live logic block 400 receives a set of inputs 403A, which are sent through inverters 407 and then combined with the contents of FIFO register 401 by gates 409 to update FIFO register 401 and produce associated outputs 405. Inputs 403A may be either the results of the comparison units in BPU or an exceptional conditions received from the execution circuitry. The input is combined with the contents of FIFO register 401 to determine the value of the live bit at that stage. For example, the input to the execute (X) bit of FIFO register 401 is the value from the preceding (i.e., decode (D)) stage ANDed with an inverted value of the input from the comparison units at that stage (i.e., kill_d). When these two values are ANDed together, the instruction is killed if either value is a 0 because the live bit is reset to zero for that stage. Instructions can transition from living to dead at any stage in FIFO register 401. These instruction deaths may be attributable to data dependencies, hardware defects, synchronous exceptions, and instruction mis-sequencing, etc.

In the preferred implementation, both in-line and branch instructions are analyzed by the BPU as if they were branches. That is, the BPU determines the address for the next correct instruction in the pipeline according to the architectural sequence. Since the data-path for communicating addresses to the rest of the processor (the branch unit specifically) already exists, no extra global buses are added to implement the invention. One advantage of this implementation is that all events that may cause an instruction address to not match up with the expected (architectural) next instruction address as computed by the branch unit are covered by the same mechanism and do not affect the correctness of the processor. These events also do not have to be separately detected and communicated to the rest of the processor.

The use of BPU to provide correct instruction sequencing results in a very high frequency processor. It also provides a pipelined, in-order machine that allows speculation with a high probability (speculative execution has usually been introduced only for super-scalar out-of-order machines). Several unique features are present in the design of the BPU. Specifically, since the processor is scalar, and instructions, though pipelined, do not go out of order (even though they write to the register file from different stages of the pipe, and thus do not complete in order) various pieces of information, such as the instruction addresses and liveness bits can be maintained in shift registers rather than tables accessed with instruction tags.

While the invention has been particularly shown and described with reference to a preferred embodiment, it will be understood by those skilled in the art that various changes in form and detail may be made therein without departing from the spirit and scope of the invention. Specifically, this invention scheme can be utilized in a super-scalar design by having the BPU 18 process each instruction packet. In this context, an instruction packet is a group of sequential instructions that can complete as a unit. In this case, the BPU 18 must compute the next sequential instruction address as a function of the instruction packet length.

What is claimed is:

1. A pipeline processor suitable to receive fetched instruction from a cache buffer and issue selected instructions to execution units, said processor comprising:

a branch processing unit (BPU);

an instruction fetch unit (IFU);

means for forwarding an address of each fetched instruction, including branch instructions and in-line instructions, to said BPU for address resolution, wherein said BPU computes for all instructions the correct architectural address for a next instruction that is to follow a current instruction being executed; and means for providing the architectural address of a next instruction according to a correct architectural sequence of addresses to the execution units of said processor following said current instruction, wherein a following instruction that is placed in the execution units after the current instruction, is allowed to complete execution only when its corresponding address matches said architectural address.

2. The processor of claim 1, further comprising:

means for calculating said correct architectural address;

means for comparing said correct architectural address to an address of the following instruction; and means for selectively killing said following instruction in the execution units of said processor, responsive to a determination that said following instruction is not the next instruction according to the correct architectural sequence.

3. The processor of claim 2, wherein, said selectively killing means includes:

a four-bit first-in first-out (FIFO) register of instruction live bits corresponding to various stages of an instruction pipeline; and means for setting a value of said instruction live bits during instruction processing, wherein a first value of an instruction live bit permits an instruction in a corresponding pipeline stage to complete and a second value results in said instruction not being allowed to complete.

4. The processor of claim 3, further comprising:

means, responsive to said selectively killing means, for signaling processor components within said processor pipeline to not complete said following instruction when an address of said following instruction does not match the architectural address determined according to the correct architectural sequence.

5. The processor of claim 4, further comprising means for initiating a fetch by the IFU of the next instruction from said cache having an address that matches the architectural address.

6. The processor of claim 5, wherein said initiating means further includes means for providing said architectural address and an instruction bad signal to said IFU to indicate that said second instruction was not a correct instruction and direct which instruction to fetch.

7. The processor of claim 1, wherein said processor is a super-scalar processor and said instructions are provided to said processor pipeline within an instruction packet, wherein further said system includes:

means for receiving a first packet of instructions and instruction packet address from an instruction fetch unit (IFU);

means for computing an architectural address of a next packet of instructions according to a correct architectural sequence;

means for receiving a second packet of instructions and corresponding instruction packet address from an instruction fetch unit;

means for comparing said corresponding instruction packet address with said architectural address, wherein said second packet of instruction is only permitted to complete when said corresponding address matches said architectural address; and means when said corresponding address does not match said architectural address for initiating a fetch of a next packet with the architectural address.

8. The processor of claim 1, further comprising a register for holding the architectural address.

9. The processor of claim 1, wherein said BPU further comprises:

means for performing branch prediction operations for branch instructions received from the IFU; and means for ensuring correct architectural sequencing of in-line instructions.

10. A system for providing all inline and branch instructions in a correct architectural sequence to a processor pipeline, said system comprising:

means for receiving a first instruction and instruction address from an instruction fetch unit (IFU);

means for computing at a branch processing unit (BPU) of the processor for all instructions an architectural address of a next instruction according to said correct architectural sequence;

means for receiving a second, in-line instruction and corresponding instruction address from said instruction fetch unit; and means for comparing said corresponding instruction address with said architectural address at said branch processing unit (BPU), wherein said second instruction is only permitted to complete when said corresponding address matches said architectural address.

11. The system of claim 10, further comprising:

means for determining within said branch processing unit when a following instruction in a stage of said processor pipeline is incorrect; and means for signaling to processor components executing said stage of the processor pipeline to not complete said instruction.

12. The system of claim 11, wherein, said determining means includes:

a four-bit first-in first-out (FIFO) register of instruction live bits corresponding to various stages of said instruction pipeline; and means for setting a value of said instruction live bits during instruction processing, wherein a first value of an instruction live bit permits an instruction in a corresponding pipeline stage to complete and a second value results in said instruction not being allowed to complete.

13. The system of claim 10, further comprising:

means, responsive to said comparing means, for signaling processor components within said processor pipeline to not complete said second instruction when said address does not match; and means for initiating a fetch by said IFU of a next instruction that has said correct architectural address.

14. The system of claim 13, wherein said initiating means further includes means for providing said architectural address and an instruction bad signal to said IFU to indicate that said second instruction was not a correct instruction and direct which instruction to fetch.

15. The system of claim 10, wherein said processor is a super-scalar processor and said instructions are provided to said processor pipeline within an instruction packet, wherein further said system includes:

means for receiving a first packet of instructions and instruction packet address from an instruction fetch unit (IFU);

means for computing an architectural address of a next packet of instructions according to said correct architectural sequence;

means for receiving a second packet of instructions and corresponding instruction packet address from said instruction fetch unit;

means for comparing said corresponding instruction packet address with said architectural address, wherein said second packet of instruction is only permitted to complete when said corresponding address matches said architectural address; and means when said corresponding address does not match said architectural address for initiating a fetch of a next packet with the architectural address.

16. A data processing system for providing all in-line and branch instructions in a correct architectural sequence to a processor pipeline, said data processing system comprising:

an instruction cache;

a pipelined processor coupled to said instruction cache, wherein said pipelined processor includes:

an instruction fetch unit (IFU) for fetching instructions from associated instruction address;

means for receiving a first instruction and corresponding first instruction address and a second instruction and corresponding second instruction address from said instruction fetch unit;

a branch processing unit (BPU) that includes logic for computing for all instructions an architect address of a next in-line instruction according to the correct architectural sequence based on said first instruction address, wherein all addresses of both in-line and branch instructions are presented to the BPU for architectural address resolution; and logic for comparing said second instruction address with said architectural address, wherein said second instruction is only permitted to complete when said second instruction address matches said architectural address.

17. The data processing system of claim 16, said pipeline processor further comprising:

logic for determining within said branch processing unit when said second instruction in a stage of said processor pipeline is incorrect; and logic for signaling to processor components executing said stage to not complete said second instruction.

18. The data processing system of claim 17, wherein, said determining logic includes:

a four-bit first-in first-out (FIFO) register of instruction live bits corresponding to various stages of said instruction pipeline; and logic for setting a value of said instruction live bits during instruction processing, wherein a first value of an instruction live bit permits an instruction in a corresponding pipeline stage to complete and a second value results in said instruction not being allowed to complete.

19. The data processing system of claim 16, further comprising:

logic, responsive to said comparing means, for signaling processor components within said processor pipeline to not complete said second instruction when said address does not match; and logic for initiating a fetch by said IFU of a next instruction that has said correct architectural address.

20. The data processing system of claim 19, wherein said logic for initiating a fetch by said IFU further includes logic for providing said architectural address and an instruction bad signal to said IFU to indicate that said second instruction was not a correct sequential instruction and direct which instruction to fetch.

21. The data processing system of claim 16, wherein said processor is a super-scalar processor and said instructions are provided to said processor pipeline within an instruction packet, wherein further said data processing system includes:

means for receiving a first packet of instructions and instruction packet address from an instruction fetch unit (IFU);

means for computing an architectural address of a next packet of instructions according to said correct architectural sequence;

means for receiving a second packet of instructions and corresponding instruction packet address from said instruction fetch unit;

means for comparing said corresponding instruction packet address with said architectural address, wherein said second packet of instruction is only permitted to complete when said corresponding address matches said architectural address; and means when said corresponding address does not match said architectural address for initiating a fetch of a next packet with the architectural address.

22. A branch processing unit within a processor comprising:

means for computing for all instructions an architectural address correlated to a correct architectural sequence of instruction addresses, based on an instruction address of a predecessor instruction;

a register for holding said architectural address;

means for verifying that instructions are flowing through processor pipeline according to said correct architectural sequence by comparing each next instruction address with a calculated architectural address of a preceding instruction;

means for terminating an instruction which is not in said correct architectural sequence; and means, responsive to terminating an instruction, for restarting instruction fetching at an address that correlates to said correct architectural sequence so that substantially little loss in processor time occurs and pipeline breaks are substantially reduced.

* * * * *